United States Patent

Van De Bogart

[11] Patent Number: 5,555,846
[45] Date of Patent: Sep. 17, 1996

[54] BIRD SNUGGLY

[76] Inventor: Linda Van De Bogart, 30415 SE. 40th, Fall City, Wash. 98024

[21] Appl. No.: 371,951

[22] Filed: Jan. 12, 1995

[51] Int. Cl.⁶ ................................................ A01K 29/00
[52] U.S. Cl. ...................................................... 119/708
[58] Field of Search ........................ 119/708, 15, 19, 119/28.5, 702, 707, 711

[56] References Cited

U.S. PATENT DOCUMENTS

| | | | |
|---|---|---|---|
| D. 224,685 | 8/1972 | Michlap | 119/28.5 X |
| 3,902,456 | 9/1975 | David | 119/28.5 |
| 3,989,008 | 11/1976 | Neumann | 119/28.5 |
| 4,576,116 | 3/1986 | Binkert | 119/19 |
| 4,729,343 | 3/1988 | Evans | 119/15 X |
| 4,977,857 | 12/1990 | Slawinski | 119/19 |
| 5,000,116 | 3/1991 | Fife et al. | 119/28.5 |
| 5,010,843 | 4/1991 | Henry | 119/28.5 |
| 5,220,884 | 6/1993 | Townsend | 119/28.5 X |
| 5,282,439 | 2/1994 | Oaks | 119/28.5 X |
| 5,351,646 | 10/1994 | Zoroufy | 119/19 |

*Primary Examiner*—Thomas Price
*Attorney, Agent, or Firm*—Christensen O'Connor Johnson & Kindness PLLC

[57] ABSTRACT

A bird snuggly for providing a pet bird a warm, secure and comfortable place to snuggle. The bird snuggly includes a cylindrical structure having open opposing ends. A plush, soft material lines the interior of the hollow structure. The plush material also includes folds that extend partially into the hollow structure, providing a soft, compliant surface into which a bird may snuggle. A rope is looped and attached to one side of the hollow structure. The rope is used to attach the bird snuggly to a support structure such as a bird cage.

3 Claims, 1 Drawing Sheet

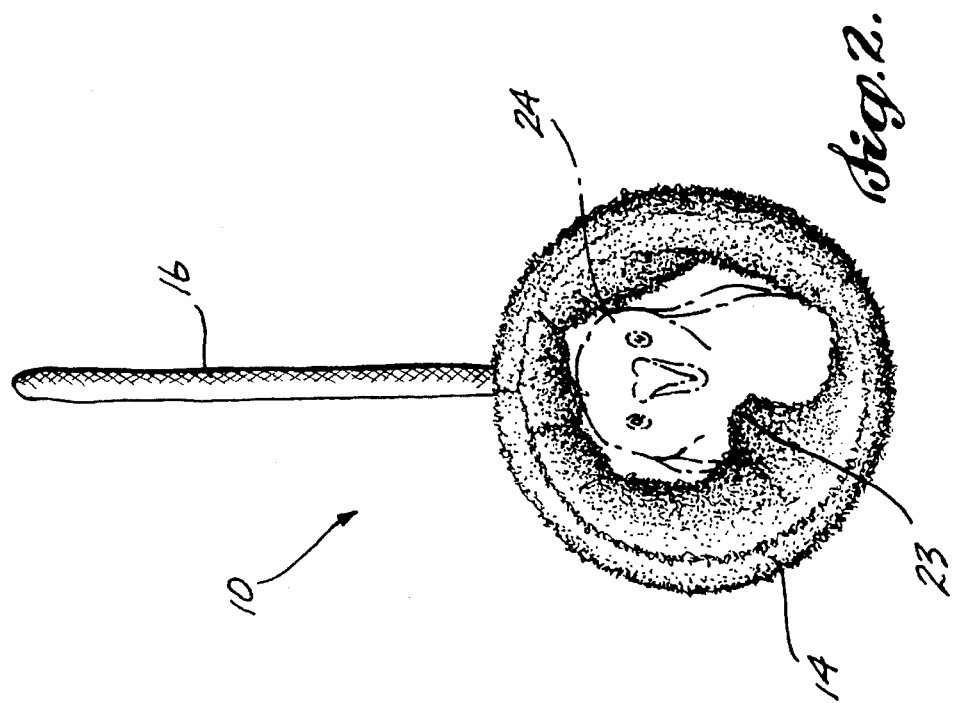
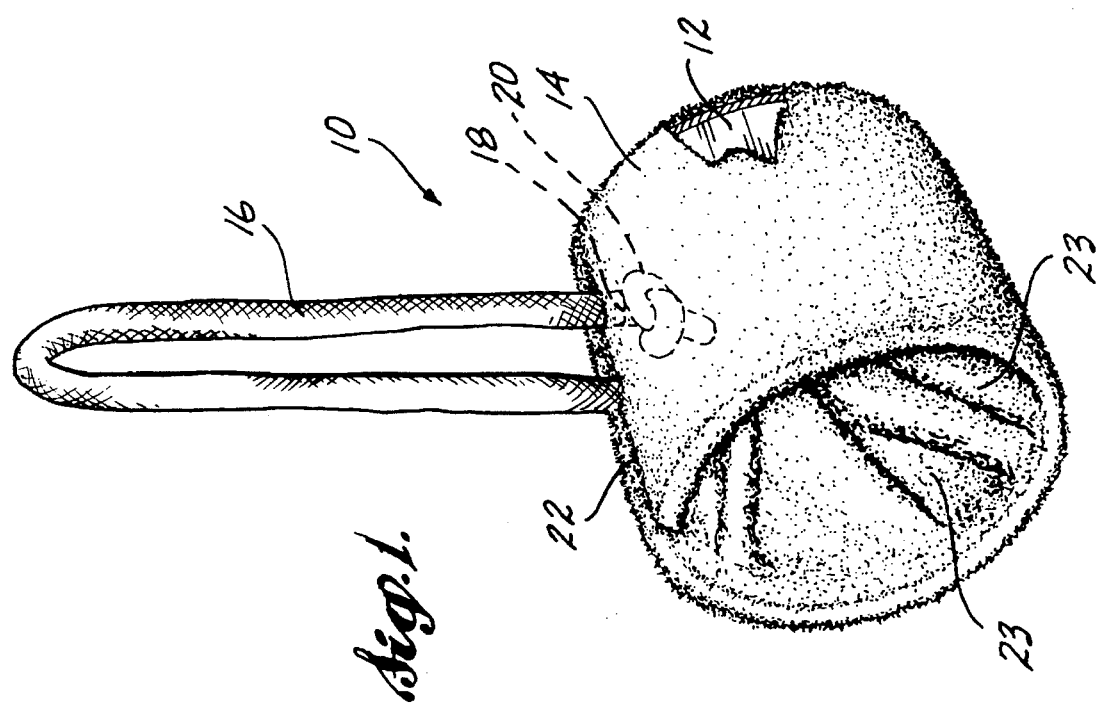

5,555,846

BIRD SNUGGLY

FIELD OF THE INVENTION

The present invention relates to toys for birds; more specifically, the present invention relates to indoor toys for pet birds.

BACKGROUND OF THE INVENTION

Pet birds enjoy snuggling their owners in order to keep warm and to play. Many pet birds enjoy crawling down the interior of an owner's shirt sleeves or shirt and then hiding as a form of play and affection. Common bird cages do not provide a pet bird a location to crawl into to hide, keep warm, or provide the pet bird with a secure, warm place to snuggle.

Thus, there exists a need for a bird toy that provides a bird a warm, safe place to hide and play. The present invention is addressed to fulfilling this need.

SUMMARY OF THE INVENTION

The present invention is a bird snuggly toy for use with a pet bird. One embodiment of the toy includes a hollow, cylindrical structure having at least one opening through which a bird may enter the structure. A soft plush material lines the interior of the structure and includes folds that extend partially into the hollow structure. The folds provide a soft, complaint surface into which the bird may snuggle.

According to other aspects of the invention, the hollow structure may have a cross section that is round, oval, rectangular or square. The toy may also include a rope attached to one side of the hollow structure. The rope is used to attach the toy to a support member such as a bird cage.

In accordance with other aspects of the invention, the plush material used on the interior of the toy is an acrylic fur.

The present invention provides a bird a soft, warm, and secure place to hide and play. The toy provides the bird a sense of security and also may be used as a toy into which or onto which the bird may perch, bite, or pull on. The present invention provides both pet birds and their owners with hours of enjoyment.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective, partial cutaway view of a preferred embodiment of the present invention; and FIG. 2 is an end view of the present invention showing a bird within the interior of the invention.

DETAILED DESCRIPTION OF THE PREFERRED EMBODIMENT

The present invention is a bird snuggly 10 that provides a warm, secure, pleasant location for a pet bird 24 to crawl into. The preferred embodiment of the bird snuggly 10 is formed of a section of a cylindrical tube 12. The interior and exterior of the tube 12 is enclosed by a plush material 14 into which the bird may snuggle to feel warm and secure. A rope 16 is attached at both ends to the top of the bird snuggly 10. The ends of the rope 16 are threaded through the cylindrical tube 12 and then tied forming knots 20 (shown in phantom in FIG. 1) on the interior of the tube.

The tube 12 may be round, rectangular, oval, or square and may be formed from any suitable material that can support the weight of the bird 24 after it enters the bird snuggly 10. In the preferred embodiment, the tube 12 has a round cross section and is formed of a recycled plastic material in order to be environmentally friendly. A round cross section is preferred because it provides a shape into which the bird 24 comfortably fits. The tube 12 may have any desired diameter in order to encompass birds of various shapes and sizes.

It is advantageous that both ends of the tube 12 be open in order to allow a bird to crawl into either end and look through the other end. However, in alternate embodiments of the invention, one end of the bird snuggly 10 could be closed. It is also advantageous that the tube 12 be formed of a material that is not toxic to birds in case the bird consumes a portion of the tube.

The plush material 14 used in the preferred embodiment is an acrylic fur that has been placed around the tube 12 and then sewn along the edges 22 so that the fur surrounds both the interior and exterior of the tube 12. The plush material 14 on the interior of the tube 12 is slightly oversized so that it produces a series of folds 23 in the material on the interior of the tube 12. The folds 23 provide a soft, flexible compliant surface into which the bird 24 may snuggle after it enters the bird snuggly 10.

Both ends of the rope 16 in the preferred embodiment are tied to form knots 20 on the interior surface of the tube 12 in order to maintain both ends of the rope attached to the bird snuggly 10. This configuration allows the rope 16 to form a loop that may be placed around a perch or other member of a bird cage to support the bird snuggly within the cage. In the preferred embodiment, the rope is formed of a cotton twist.

In alternate embodiments, the rope 16 may be formed from other materials and attached to the bird snuggly 10 in other manners. It is advantageous that the material used to form the rope 16 be nontoxic to birds to prevent harm to the bird upon being consumed.

Although it has been found advantageous to use an acrylic fur, other materials could also be used. It is advantageous that the plush material 14 used be soft and supple to allow a comfortable and cozy surface into which the bird 24 may snuggle. It is also advantageous that the plush material 14 on the interior of the bird snuggly form folds 23. The folds may move or deform upon contact with the bird 24 thus increasing comfort. However, in alternate embodiments of the invention, plush materials 14 could be used that do not form folds 23.

The present invention provides a warm, secure place for a bird to enter and snuggle within an otherwise cold and drab cage. Thus, the present invention provides both birds and their users a great deal of enjoyment and comfort.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A bird snuggly toy for use with a pet bird, the toy comprising:
    a tube having an approximately circular cross section sized to closely accommodate the bird, said tube having openings at both ends to allow the bird to enter the tube at either end;

a rope attached to the top of the tube at both ends and extending upward from the surface of the tube to form a loop to hang the toy from a bird cage, the rope being formed of a nontoxic material; and a plush, soft, nontoxic material lining the interior and exterior of the tube, said material gathered to form a plurality of folds in said material that extend inward from the interior surface of the tube to provide a soft, compliant, plush surface into which the bird may snuggle, the folds compressing to conform to the shape of the bird when the bird presses against the folds.

2. The toy of claim 1 wherein both ends of the rope are threaded through holes in the tube and tied on each end of the rope to form a knot on the interior of the tube thereby attaching the rope to the tube.

3. The toy of claim 1, wherein the plush material is an acrylic fur.

* * * * *